Figure 1:
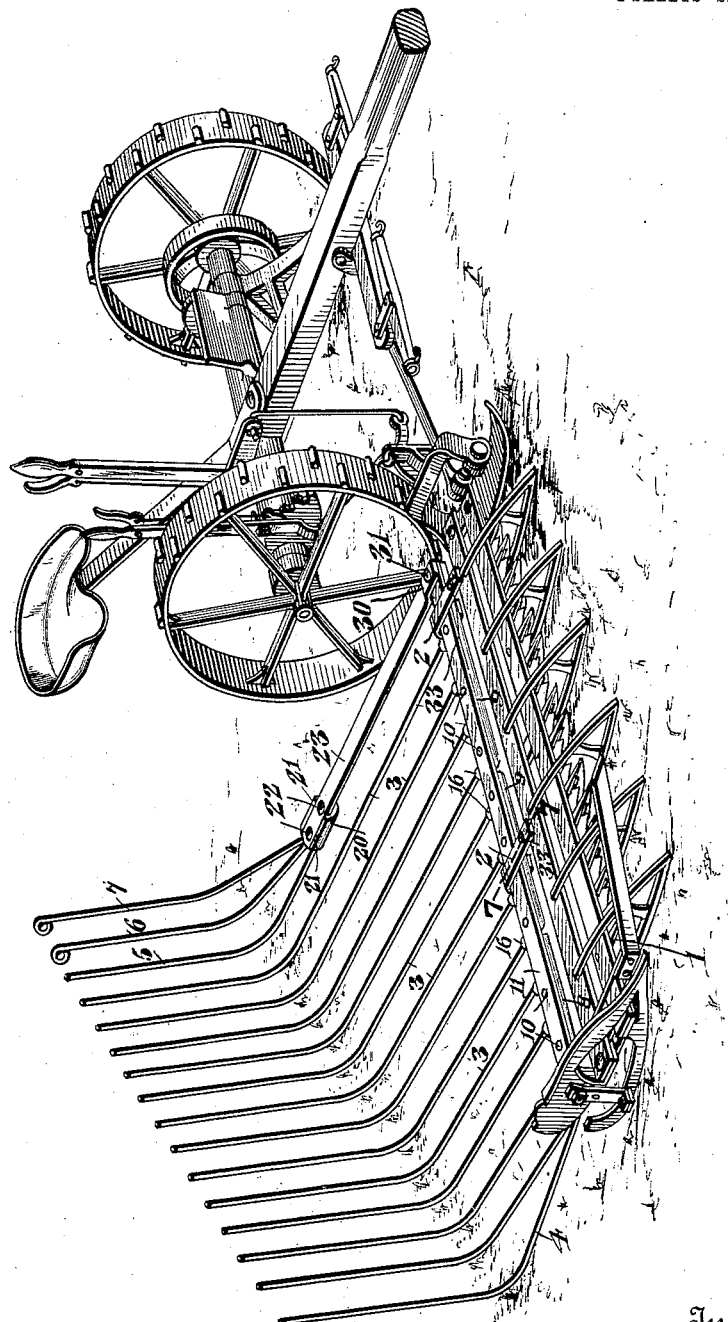

L. FRANZMEIER.
WINDROWER.
APPLICATION FILED DEC. 31, 1907.

898,571.

Patented Sept. 15, 1908.

2 SHEETS—SHEET 1.

Witnesses
Jas. H. McCathran
J. F. Riley

Lewis Franzmeier, Inventor
By E. G. Siggers
Attorney

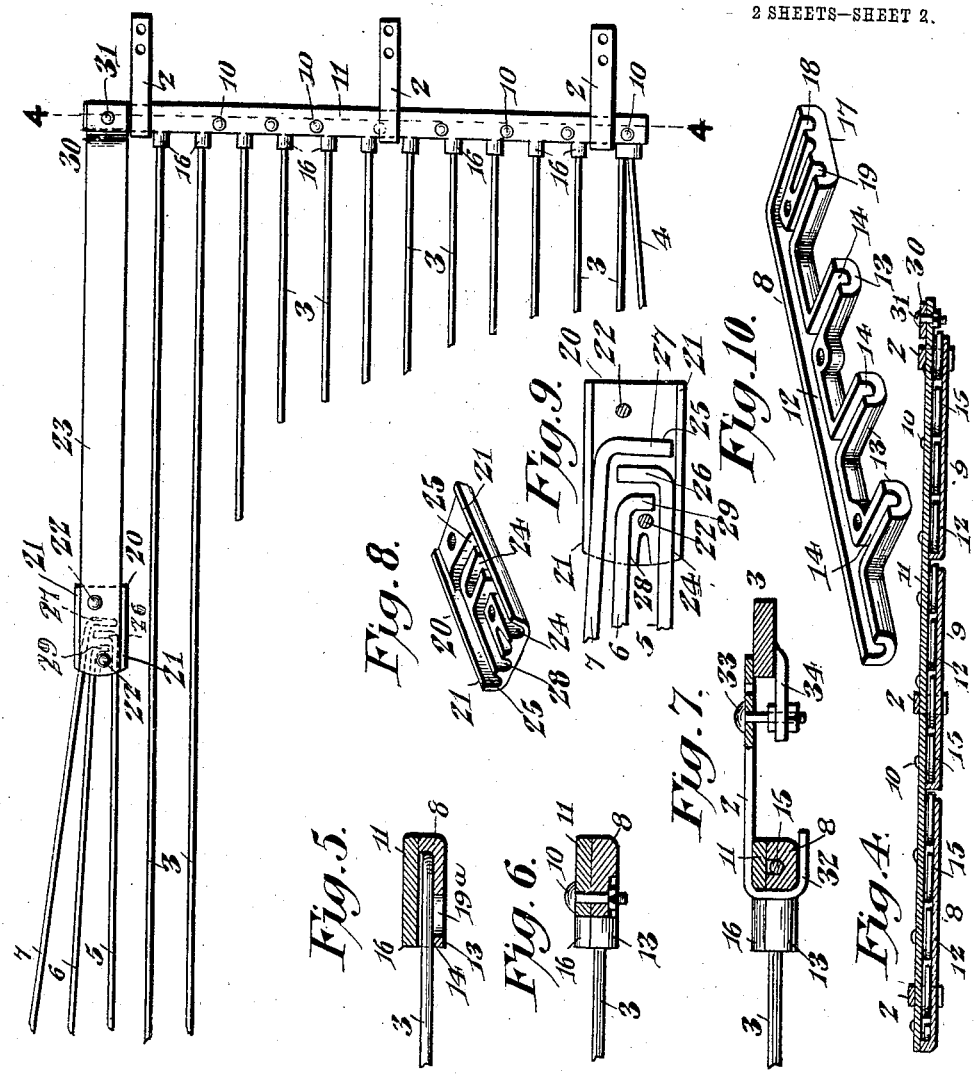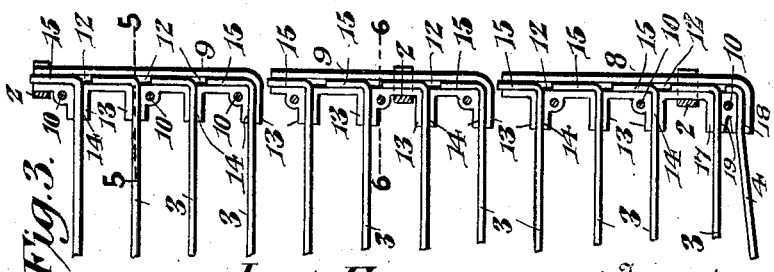

UNITED STATES PATENT OFFICE.

LEWIS FRANZMEIER, OF NEWTON, WISCONSIN.

WINDROWER.

No. 898,571.　　　Specification of Letters Patent.　　　Patented Sept. 15, 1908.

Application filed December 31, 1907.　Serial No. 408,722.

*To all whom it may concern:*

Be it known that I, LEWIS FRANZMEIER, a citizen of the United States, residing at Newton, in the county of Manitowoc and State of Wisconsin, have invented a new and useful Windrower, of which the following is a specification.

The invention relates to improvements in windrowers.

The object of the present invention is to improve the construction of windrowers, more especially the manner of attaching the front ends of the rods, and to provide a simple and comparatively inexpensive side delivery windrower of great strength and durability, designed to be applied to an ordinary mower and adapted to permit the rods to have an individual limited vertical oscillatory movement to conform to the configuration of the ground.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a windrower, constructed in accordance with this invention and shown applied to a mower. Fig. 2 is a plan view of the windrower. Fig. 3 is a horizontal sectional view of the front portion of the windrower. Fig. 4 is a transverse sectional view on the line 4—4 of Fig. 2. Fig. 5 is a detail sectional view on the line 5—5 of Fig. 3. Fig. 6 is a similar view on the line 6—6 of Fig. 3. Fig. 7 is a detail sectional view, taken substantially on the line 7—7 of Fig. 1. Fig. 8 is a detail perspective view of the clamping member for holding the short inner rods. Fig. 9 is a detail view, showing the front ends of the short inner rods arranged in the grooves of the clamping member. Fig. 10 is a detail perspective view of the outer rod supporting section.

Like numerals of reference designate corresponding parts in all the figures of the drawings.

The windrower, which is attached to the cutting apparatus 1 of an ordinary mower by clips 2, is equipped with a plurality of longitudinally disposed rods 3, arranged in parallelism and having their rear portions bent upwardly. It is also provided with an outer rod 4 and a plurality of short inner rearwardly diverging rods 5, 6 and 7. The outer rod 4 diverges from the adjacent rod 3, as clearly shown in Fig. 1 of the drawings, and the group of short inner rods is mounted in rear of the front ends of the other rods, as hereinafter fully explained.

The rods 3 and 4 of the windrower are mounted in a series of supporting sections 8 and 9, arranged transversely of the front end of the windrower and secured by bolts 10, or other suitable fastening devices to a transverse connecting cap bar 11. The rod supporting sections 8 and 9, which are provided with channels or grooves 12, have rearwardly extending fingers 13, which are also provided with grooves 14, communicating with the said grooves or channels 12. The front ends of the rods 3 are bent laterally at right angles to provide arms 15, and they are fitted in the grooves of the rod supporting sections 8 and 9. The transverse connecting cap bar is provided with rearwardly extending lugs 16, which fit over the grooves of the rearwardly extending fingers 13 of the rod supporting sections. The transversely bent terminals 15 of the rods 3 form pivots and as the grooves 13 are deeper than the diameter of the rods, as clearly illustrated in Fig. 5 of the drawings, the rods are permitted an independent limited vertical oscillatory movement to permit the windrower to conform to the configuration of the rough or uneven ground.

The outer section 8 is provided at its outer end with an enlarged finger 17, having two grooves 18 and 19, which receive the outer rod 4 and the adjacent rod 3. The grooves 18 and 19 are also of the same depth as the grooves 14, and the outer rod 4 and the adjacent end rod 3 are capable of a limited vertical oscillatory movement. The fingers are provided at the bottom of their grooves with slots or openings $19^a$, which permit accumulation to drop through the fingers and thereby prevent the rods from becoming clogged. The slots or openings also lighten the construction.

The inner short rods 5, 6 and 7 have their rear portions bent upwardly and arranged in substantial alinement with the upwardly extending portions of the other rods. The front ends of the rods 5, 6 and 7 are held in a clamping plate or member 20, provided with parallel upwardly extending side flanges 21 and secured by bolts 22 to the rear end of a longitudinal connecting bar 23. The clamping plate or member 20 is provided at opposite sides with L-shaped grooves 24 and 25, and the front ends of the rods 5 and 7 have their front terminals 26 and 27 bent laterally at right angles, or substantially at right angles to fit the L-shaped grooves 24 and 25. The clamping plate or member is also provided with an intermediate L-shaped groove 28 to receive the front end of the rod 6, which is located between the rods 5 and 7. The rod 6 has its front end 29 bent at right angles to fit in the groove 28. When the clamping plate or member is secured to the longitudinal connecting bar 23, the short rods 5, 6 and 7 are securely held in the grooves of the said clamping plate or member. The longitudinal rod 23, which extends rearwardly from a transverse connecting bar 11, is provided at its front end with a bend 30, forming a shoulder to fit against the rear edge of the bar 11. The front end of the bar 23 is secured by a bolt 31, or other suitable fastening device to the rear end of the connecting bar 11. The group of the inner bars increase the width of the windrower at the inner sides thereof and insure a proper clearance or discharge of material at the inner side of the windrower in rear of the mower.

The clips 2 are provided with downwardly extending hook-shaped rear ends 32, which embrace the transverse top connecting bar and the rod supporting sections, as clearly shown in Fig. 7 of the drawings. The front ends of the clips are secured by bolts 33 to projecting lugs or portions 34 of the cutting apparatus, but they may be connected with the same in any other preferred manner.

Having thus fully described my invention, what I claim as new and desire to secure by Letters Patent, is:—

1. A windrower comprising a plurality of rods having their front ends bent laterally, a plurality of transversely disposed rod supporting sections having longitudinal grooves to receive the laterally bent terminals of the rods and provided with rearwardly extending fingers having grooves receiving the rods, and a transversely disposed connecting cap bar fitted over the said sections and secured to the same and provided with rearwardly projecting lugs arranged over the said fingers.

2. A windrower comprising a plurality of rods having their front ends bent laterally, a plurality of transversely disposed rod supporting sections having longitudinal grooves to receive the laterally bent terminals of the rods and provided with rearwardly extending fingers having grooves receiving the rods, and a transversely disposed connecting cap bar fitted over the said sections and confining the rods in the grooves, the latter being of greater depth than the diameter of the rods to permit the latter to have a limited independent upward and downward movement.

3. In a windrower, the combination of a rod supporting section provided with a longitudinal groove and having rearwardly extending fingers provided with grooves, said section being also provided with an outer enlarged rearwardly extending finger having a pair of grooves, rods having their front ends bent laterally and fitted in the said grooves, and a cap bar arranged upon the said section and confining the rods in the grooves.

4. In a windrower, the combination of a rod supporting section having a longitudinal groove and provided with rearwardly extending fingers having grooves, said fingers being also provided at the bottom of the grooves with slots, rods having laterally bent ends arranged in the said grooves and having a limited vertical movement, and a cap bar arranged upon the said section and retaining the rods in the said grooves.

5. A windrower comprising a series of longitudinal rods, means arranged transversely of the rods for connecting the front ends of the same, a longitudinal bar located at the inner side of the series and extending rearwardly from the said connecting means, and a group of rearwardly diverging rods connected at their front ends to the said longitudinal bar.

6. A windrower comprising a series of longitudinal rods, a plurality of rod supporting sections arranged transversely of the front end of the windrower and provided with grooves receiving the said rods, a cap bar fitted over the sections and secured to the same, a longitudinal bar arranged at the inner side of the said series of the rods and secured at its front end to the cap bar, and a group of rearwardly diverging rods carried by the rear end of the longitudinal bar.

7. In a windrower, the combination with a series of rods, of a longitudinal bar arranged at the inner side of the series, a group of inner rearwardly extending rods having their front ends bent laterally, and a clamping member secured to the longitudinal bar and provided with grooves fitting the rods, which are retained in the grooves by the said bar.

8. A windrower including a series of longitudinal rods, a longitudinal bar located at the inner side of the series, a clamping member secured to the rear end of the longitudinal bar and provided with side flanges for embracing the same and having grooves, and a group of short rearwardly extending rods secured in the said grooves and carried by the longitudinal bar.

9. A windrower including a series of longitudinal rods, a longitudinal bar located at the inner side of the series, a clamping member secured to the longitudinal rod and provided with opposite L-shaped grooves and having an intermediate L-shaped groove, and a group of short rearwardly extending rods having their front ends bent laterally to fit the grooves of the clamping member and carried by the said longitudinal bar.

In testimony, that I claim the foregoing as my own, I have hereto affixed my signature in the presence of two witnesses.

LEWIS FRANZMEIER.

Witnesses:
C. E. BRADY,
A. L. HENGEN.